United States Patent [19]

Bertus et al.

[11] Patent Number: 4,632,748
[45] Date of Patent: Dec. 30, 1986

[54] CRACKING PROCESS

[75] Inventors: Brent J. Bertus; Chia-Min Fu, both of Bartlesville, Okla.

[73] Assignee: Phillips Petroleum Co., Bartlesville, Okla.

[21] Appl. No.: 693,565

[22] Filed: Jan. 22, 1985

[51] Int. Cl.$^4$ .................. C10G 11/18; B01J 38/56
[52] U.S. Cl. .................. 208/120; 208/52 CT; 502/31; 502/521
[58] Field of Search ............ 208/120, 52 CT; 502/29, 502/31, 514, 518, 521

[56] References Cited

U.S. PATENT DOCUMENTS

| | | | |
|---|---|---|---|
| 2,425,482 | 8/1947 | Moser | 196/52 |
| 2,456,148 | 12/1948 | Read, Jr. | 502/31 |
| 2,754,344 | 7/1956 | Weatherly | 502/31 |
| 3,120,484 | 2/1964 | Mills et al. | 208/120 |
| 3,354,077 | 11/1967 | Hanaford et al. | 208/111 |
| 4,209,453 | 6/1980 | Bertus et al. | 208/120 |
| 4,231,899 | 11/1980 | Chen et al. | 252/455 Z |
| 4,268,416 | 5/1981 | Stine et al. | 252/416 |
| 4,276,149 | 6/1981 | Chester et al. | 208/120 |
| 4,361,496 | 11/1982 | Castillo et al. | 208/120 |
| 4,364,848 | 12/1982 | Castillo et al. | 252/417 |
| 4,372,841 | 2/1983 | Stonte et al. | 208/120 |
| 4,377,470 | 3/1983 | Hettinger, Jr. et al. | 208/120 |
| 4,382,015 | 5/1983 | Castillo et al. | 252/417 |

FOREIGN PATENT DOCUMENTS 0038498  3/1977  Japan ..................... 502/55

Primary Examiner—Andrew H. Metz
Assistant Examiner—Anthony McFarlane

[57] ABSTRACT

In a cracking process wherein used zeolitic catalyst is withdrawn from the cracking zone and treated with steam and then returned to the cracking zone, the improvement comprising diluting the steam with an organic compound.

22 Claims, No Drawings

CRACKING PROCESS

BACKGROUND OF THE INVENTION

The present invention relates to the conversion of hydrocarbon containing oils into lighter fractions by cracking in the presence of a zeolite-containing cracking catalyst.

Most commercial cracking operations today employ a zeolite-containing cracking catalyst. Generally the cracking process involves contacting the cracking catalyst with steam during certain portions of the process. Examples include the use of steam to remove absorbed or entrained hydrocarbons from catalyst removed from the cracking zone and the use of steam to transfer new catalyst and regenerated used catalyst back to the cracking zone.

It has been noted by many that the steam has an adverse effect upon the surface area of the zeolite which in turn has an adverse effect on the activity of the cracking catalyst.

An object of the present invention is to provide a means for counteracting at least some of the adverse effects that steam has on zeolite-containing cracking catalysts.

SUMMARY OF THE INVENTION

The present invention relates to a cracking process wherein a hydrocarbon-containing feed is contacted with a zeolite-containing cracking catalyst in a cracking zone under cracking conditions and at least a portion of the zeolite-containing cracking catalyst is removed from the cracking zone, at least a portion of that cracking catalyst is contacted with a treating fluid comprising steam, and then at least a portion of the steam treated cracking catalyst is recycled back to the cracking zone. In accordance with the present invention there is employed in the steam-containing treating fluid a suitable organic compound in an amount sufficient to reduce the adverse effect that the steam has on the surface area of the catalyst.

DETAILED DESCRIPTION

The hydrocarbon feedstock may comprise naphthas, light gas oils, heavy gas oils, residual fractions, reduced crude oils, cycle oils derived from any of these, as well as suitable fractions derived from shale oil kerogen, tar sands, bitumen processing, synthetic oils, coal hydrogenation, and the like. Such feedstocks may be employed singly, separately in parallel reaction zones, or in any desired combination. Typically, these feedstocks will contain metal contaminants such as nickel, vanadium and/or iron. Heavy feedstocks typically contain relatively high concentrations of vanadium and/or nickel. The invention is particularly applicable to those oils containing components boiling above 650° F.

The preferred zeolite-containing catalysts used in the present invention may include any zeolite, whether natural, semi-synthetic or synthetic, alone or in admixture with other materials which do not significantly impair the suitability of the catalyst. For example, if the catalyst is a mixture, it may include the zeolite component associated with or dispersed in a porous refractory inorganic oxide carrier; in such case the catalyst may for example contain about 1% to about 60%, more preferably about 1 to about 40% and most typically about 5 to about 40% by weight of the zeolite dispersed in the carriers, based on the total weight of catalyst (water free basis) of the porous refractory inorganic oxide alone or in combination with any of the known adjuvants for promoting or suppressing various desired and undesired reactions.

For a general explanation of the genus of zeolite molecular sieve catalysts useful in the invention, attention is drawn to the disclosures of the articles entitled "Refinery Catalysts Are a Fluid Business" and "Making Cat Crackers Work on Varied Diet," appearing respectively in the July 26, 1978 and Sept. 13, 1978 issues of *Chemical Week* magazine. The descriptions of the aforementioned publications are incorporated herein by reference.

Examples of commercially available catalysts useful in the present invention are shown in U.S. Pat. No. 4,299,687 to George Myers, et al, also incorporated herein by reference.

In general, it is preferred to employ catalysts having an overall particle size in the range of about 5 to about 160 microns, more preferably about 40 to about 120 microns, and containing a proportionately major amount in the 40 to about 80 microns range.

The invention is considered applicable to any of the conventional cracking processes, including hydrocracking processes as well as catalytic processes in which no hydrogen is added to the cracking zone. Typically such processes involve contacting the hydrocarbon feed with the catalyst under cracking conditions; removing "spent", "used", or "coked" catalyst to a regeneration zone wherein carbon is removed from the catalyst, and recycling the thus regenerated catalyst to the cracking zone.

Typical conditions for the cracking include a temperature in the range of about 900° F. to about 1400° F., more preferably 925° F. to 1300° F., still more preferably 950° F. to 1200° F. Generally, this temperature is measured at the outlet of the cracking zone.

Typically the pressure in the cracking zone is in the range of about 10 to 50 psia, preferably 15 to 35 psia and most preferably about 20 to about 35 psia.

Typically the weight ratio of catalyst to fresh feed is in the range of 3/1 to 18/1, preferably 4/1 to 12/1, more preferably 5/1 to 10/1.

As is known in the art regeneration of "coked" catalyst can be carried out under either oxidation or reduction conditions, depending generally upon the type of catalyst employed. The upper temperature limits for regeneration in catalytic cracking are normally defined by metallurgical limitations and the hydrothermal stability of the particular catalyst being employed. Generally regenerations are conducted at temperatures in the range of about 1100° F. to 1600° F., measured at the regenerator catalyst outlet. More preferable regeneration temperatures are in the range of 1200° F. to 1500° F.

The employment of the organic compound in the steam in accordance with this invention can be done at any point where the catalyst is contacted with steam. Most preferably, the invention is employed at each point where the catalyst is contacted with steam.

Some typical points at which steam is conventionally employed are (1) in a stripping zone wherein hydrocarbons are removed from the cracking catalyst before the catalyst is passed to a regeneration zone; (2) in a stripping zone subsequent to the regeneration zone which removes oxygen from the regenerated catalyst before that catalyst stream is contacted with hydrocarbon feed; (3) as a transport fluid for moving the catalyst, as from the regenerator to the cracking zone; and as a dispersion fluid for effecting mixing between the catalyst and the hydrocarbon feedstock.

Typically the stripping of the catalyst prior to regeneration is conducted at a temperature in the range of 840° F. to 1120° F. In accordance with one embodiment of the present invention it is advantageous to use higher temperature, viz. 950° F. to 1290° F., and a shorter contact time has normally been employed in the past. The use of the organic compound in the treating fluid reduces the adverse effects of the steam so that higher temperatures can be employed which would heretofore have had too serious an effect on the surface area of the catalyst.

Stripping of the catalyst subsequent to regeneration is typically conducted at temperatures in the range of 1250° F. to 1370° F.

It is considered that any organic compound which will be gaseous in the treating fluid will be suitable for this invention. Examples include hydrocarbons and organic sulfur, nitrogen, or oxygen-containing compounds, especially those having a molecular weight no greater than 200. Some typical examples include ethane, butane, pentane, n-heptane, isobutane, isoprene, 1-octene, benzene, toluene, xylenes, cyclohexane, cyclohexene, pentanol, ethylbenzoate, benzoic acid, methyl-tertiary butyl ether, methyl-phenyl ether, pyridine, pyrrole, quinoline, furan, thiophene, phenylacetic acid, oleic acid, lauric acid, benzamide, thiophenol, methyl phenyl ketone, and ethyl-pentyl ketone.

The use of hydrocarbons is especially preferred at this time, especially those hydrocarbons containing 1 to 20 carbon atoms per molecule, more preferably those containing 4 to 20 carbon atoms per molecule. The currently most preferred hydrocarbons are aromatic hydrocarbons or alkanes, in both cases most preferably having a molecular weight of no more than 100.

The organic compound can be employed in any effective amount. Generally, the organic compound would constitute 0.25 to 25 volume % of the treating fluid and generally the remainder would be vaporous water. More typically the organic compound would constitute 0.5 to 20, or more preferably 1 to 20 weight percent of the steam containing treating fluid.

A further understanding of the present invention and its advantages will be provided by the following examples.

EXAMPLE I

Portions of a fresh commercial cracking catalyst were impregnated with nickel, vanadium, and antimony to simulate a used catalyst from a cracking process in which nickel and vanadium contaminants are contained in the feed and in which antimony is added to counteract adverse effects of the nickel and vanadium. The fresh catalyst comprised an aluminosilicate zeolite. The fresh catalyst had a surface area of 195 $m^2$/gm. The amounts of nickel, vanadium, and antimony added were 0.14, 0.34, and 0.06 weight percent respectively, based on the weight of the fresh catalyst.

One 50 gram portion of the impregnated catalyst was charged to a hard steamer with 80 ml of deionized water. The catalyst was steamed for 17 hours at 1290° F. and 40 psi. Then the catalyst was calcined with air at 1250° F. for 10 hours. This catalyst will be referred to as Catalyst A.

Another 50 gram portion of the impregnated catalyst was charged to a hard steamer with 60 ml of deionized water and 20 ml of n-heptane. The catalyst was steamed for 17 hours at 1290° F. and 42 psi. Then the catalyst was calcined with air at 1250° F. for 10 hours. This catalyst will be referred to as Catalyst B.

Still another 50 gram portion of the impregnated catalyst was charged to a hard steamer with 60 ml of deionized water and 20 ml of n-heptane. The catalyst was steamed for 17 hours at 1290° F. and 40 psi. Then the catalyst was calcined with air at 1250° F. for 1250° F. This catalyst will be referred to as Catalyst C.

Each of these catalysts were tested for activity in bench scale laboratory fluidized bed reactors at 950° F., 1 atmosphere pressure, and a 7/1 catalyst/oil ratio. The feed was a West Texas topped crude.

The surface area of the calcined catalysts and the conversion of feed was as follows:

|  | Surface Area, $m^2$/gm | Conversion, vol % |
|---|---|---|
| Catalyst A | 99 | 85 |
| Catalyst B | 167 | 94 |
| Catalyst C | 147 | 89 |

The results demonstrate that the activity of the catalysts is affected by the surface area of the catalysts and that the use of n-heptane with steam reduces the loss in surface area that occurs when the catalyst is contacted with steam.

EXAMPLE II

The same fresh commercial cracking catalyst as used in Example I was coked in a laboratory bench scale fluidized bed reactor by employing it to crack a West Texas topped crude. The temperature employed was 950° F. and the catalyst/oil ratio was about 7/1. After two such runs the coked catalyst was recovered and found to have a surface area of 143 $m^2$/g as compared to the 196 $m^2$/g surface area of the fresh catalyst.

A first portion of the coked catalyst, viz. 35 gms, was charged to the hard steamer with 80 ml of deionized water and steamed at 40 psig and 1290° F. for 17 hours. After the steaming the catalyst had a surface area of 153 $m^2$/g. The steamed catalyst was then calcined in air for 10 hours at 1250° F. The thus regenerated catalyst had a surface area of 164 $m^2$/g.

A second 35 gm portion of the coked catalyst was charged to the hard steamer with 60 ml of deionized water and 20 ml of toluene and steamed at 40 psig and 1290° F. for 17 hours. After steaming the catalyst had a surface area of 109 $m^2$/g. A portion of this steamed catalyst was regnerated by being calcined in air for 10 hours at 1250° F. The thus regenerated catalyst had a surface area of 179 $m^2$/g.

Although the surface area of the catalyst after steaming with toluene present was greater than that of the catalyst steamed with just water, inventive steam treatment had a less adverse effect upon the surface area as shown by the higher surface area after calcination. The lower surface area of the unregenerated catalyst steamed in accordance with this invention may possibly be attributed to additional hydrocarbon or carbon which becomes associated with the catalyst during steaming with added hydrocarbon. This example demonstrates that there is even an advantage to employing hydrocarbon in steam that is used to contact coked catalysts, i.e. as in the stripping zone.

EXAMPLE III

The same fresh commercial cracking catalyst as used in Example I was used to evaluate the effect of toluene in steam treatment. As a control 50 gms of the fresh catalyst and 80 ml of deionized water were charged to the hard steamer and the catalyst was steamed at 40 psi for 17 hours at 1290° F. The resulting catalyst had a nitrogen surface area of 116 m$^2$/gm as compared with 195 m$^2$/g for the starting catalyst.

Another 54 gms of the fresh catalyst was steamed in the hard steamer using 60 ml of deionized water and 20 ml of toluene at 1290° F. and 42 psi for 17 hours. The resulting catalyst had a surface area of 170 m$^2$/g. This clearly demonsirates that the hydrocarbon in some way helps to preserve the surface area during steam treatments of the catalyst.

What is claimed is:

1. In a cracking process wherein a hydrocarbon-containing feed is contacted with a zeolite-containing cracking catalyst in a cracking zone under cracking conditions and at least a portion of the zeolite-containing catalyst is removed from the cracking zone, contacted with treating fluid comprising steam, and then recycled back to the cracking zone, the improvement comprising employing in the treating fluid an orgainc compound selected from hydrocarbons containing at least 5 carbon atoms per molecule and a molecular weight of no more than 100, in an amount sufficient to reduce the adverse effect that the steam has on the surface of the cracking catalyst.

2. A process according to claim 1 wherein the cracking catalyst is removed from the cracking zone and contacted with said treating fluid in a stripping zone to remove hydrocarbons from the catalyst.

3. A process according to claim 2 wherein the catalyst is removed from the stripping zone and passed to a regeneration zone wherein carbon is removed from the catalyst and regenerated catalyst is removed from the regeneration zone and recycled to the cracking zone.

4. A process according to claim 3 wherein regenerated catalyst is contacted with said treating fluid again prior to being recycled to the cracking zone.

5. A process according to claim 1 wherein the cracking catalyst is removed from the cracking zone, passed to a regeneration zone wherein carbon is removed from the catalyst, and regenerated catalyst is removed from the regeneration zone and recycled to the cracking zone, said regenerated catalyst being contacted with said treating fluid prior to being recycled to the cracking zone.

6. A process according to claim 1 wherein said organic compound is selected from alkanes.

7. A process according to claim 1 wherein said organic compound comprises n-heptane.

8. A process according to claim 2 wherein said organic compound comprises n-heptane.

9. A process according to claim 3 wherein said organic compound comprises n-heptane.

10. A process according to claim 4 wherein said organic compound comprises n-heptane.

11. A process according to claim 5 wherein said organic compound comprises n-heptane.

12. A process according to claim 7 wherein the n-heptane is about 1 to 20 volume present of said treating fluid.

13. A process according to claim 1 wherein the organic compound is about 1 to 20 volume percent of the treating fluid.

14. A process according to claim 2 wherein said organic compound comprises toluene.

15. A process according to claim 3 wherein said organic compound comprises toluene.

16. A process according to claim 4 wherein said organic compound comprises toluene.

17. A process according to claim 5 wherein said organic compound comprises toluene.

18. A process according to claim 1 wherein said cracking catalyst is contacted with said treating fluid prior to the recontact of said cracking catalyst with the hydrocarbon feed.

19. In a cracking process wherein a. hydrocarbon-containing feed is contacted with a zeolite-containing cracking catalyst in a cracking zone under cracking conditions and at least a portion of the zeolite-containing cracking catalyst is removed from the cracking zone, contacted with treating fluid comprising steam, and then recycled back to the cracking zone, the improvement comprising employing in the treating fluid an organic compound selected from n-heptane and toluene in an amount sufficient to reduce the adverse effect that the steam has on the surface area of the cracking catalyst.

20. In a cracking process wherein a hydrocarbon-containing feed is contacted with a zeolite-containing cracking catalyst in a cracking zone under cracking conditions and at least portion of the zeolite-containing cracking catalyst is removed from the cracking zone, contacted with treating fluid comprising steam, and then recycled back to the cracking zone, the improvement comprising employing in the treating fluid an organic compound selected from an aromatic hydrocarbon having a molecular weight of no more than 100.

21. A process according to claim 20 wherein said organic compound comprises toluene.

22. In a cracking process wherein a hydrocarbon-containing feed is contacted with a zeolite-containing cracking catalyst in a cracking zone under cracking conditions and at least a portion of the zeolite-containing cracking catalyst is removed from the cracking zone, contacted with treating fluid comprising steam, and then recycled back to the cracking zone, the improvement comprising employing in the treating fluid an organic compound selected from the group consisting of hydrocarbons, sulfur-containing organic compounds, nitrogen-containing organic compounds and oxygen-containing organic compounds, said organic compound having at least five carbon atoms per molecule and a molecular weight of no more than 100, in an amount sufficient to reduce the adverse effect that the steam has on the surface area of the cracking catalyst.

* * * * *